United States Patent [19]
Clark et al.

[11] Patent Number: 5,735,572
[45] Date of Patent: Apr. 7, 1998

[54] VEHICLE SEAT BACK FRAME AND AIRBAG MODULE ASSEMBLY

[75] Inventors: David Webster Clark, Troy; Joseph Robert Brown, Grosse Ile; Marshall Lawrence Quade, Pinckney, all of Mich.

[73] Assignee: Ford Global Technologies, Inc., Dearborn, Mich.

[21] Appl. No.: 786,390

[22] Filed: Jan. 16, 1997

[51] Int. Cl.$^6$ .............................. B60N 2/42; B60R 21/22
[52] U.S. Cl. .............. 297/216.13; 297/216.1; 297/452.2; 280/730.2
[58] Field of Search ............ 297/216.13, 216.14, 297/216.1, 216.11, 452.2, DIG. 3, 217.1; 280/730.2

[56] References Cited

U.S. PATENT DOCUMENTS

| | | | |
|---|---|---|---|
| 5,498,030 | 3/1996 | Hill et al. | 280/730.2 X |
| 5,503,428 | 4/1996 | Awotwi et al. | 297/216.13 X |
| 5,533,750 | 7/1996 | Karlow et al. | 280/730.2 |
| 5,542,691 | 8/1996 | Marjamski et al. | 280/730.2 X |
| 5,547,214 | 8/1996 | Zimmer, II et al. | 280/730.2 X |
| 5,553,887 | 9/1996 | Karlow et al. | 280/730.2 |
| 5,556,127 | 9/1996 | Hurford et al. | 280/730.2 |
| 5,564,735 | 10/1996 | Boy et al. | 280/730.2 |
| 5,564,739 | 10/1996 | Davidson | 280/730.2 X |
| 5,573,271 | 11/1996 | Headley | 280/730.2 X |
| 5,586,782 | 12/1996 | Zimmerman, II et al. | 280/730.2 |
| 5,588,670 | 12/1996 | Storey et al. | 280/730.2 |
| 5,588,671 | 12/1996 | Boumarafi et al. | 280/730.2 |
| 5,601,332 | 2/1997 | Schultze et al. | 297/216.13 |
| 5,605,346 | 2/1997 | Cheung et al. | 280/730.2 X |
| 5,628,527 | 5/1997 | Olson et al. | 280/730.2 |

*Primary Examiner*—Peter M. Cuomo
*Assistant Examiner*—Rodney B. White
*Attorney, Agent, or Firm*—Daniel M. Stock; Roger L. May

[57] ABSTRACT

A vehicle seat back frame assembly includes a substantially U-shaped frame assembly incorporating a side impact airbag module as a structural, load-bearing component thereof. The substantially U-shaped frame assembly includes a curved top portion having opposing ends and a spacer attached to one of the opposing ends. The side impact airbag module has first and second ends, with the first end being attached to the other of the opposing ends. First and second support members are attached to the spacer and the second end of the airbag module, respectively, for securing the seat back frame assembly in the vehicle.

10 Claims, 1 Drawing Sheet

VEHICLE SEAT BACK FRAME AND AIRBAG MODULE ASSEMBLY

TECHNICAL FIELD

The present invention relates to a vehicle seat back frame assembly incorporating an airbag module as a structural component thereof.

BACKGROUND OF THE INVENTION

In the past few years, side impact airbags have become an increasingly popular vehicle safety option. Such airbags are typically mounted within the seat assembly and include a bracket assembly for securing the airbag module to the seat back frame. In other designs, the side impact airbag module may be incorporated in the door or side body support beam of the vehicle.

Accordingly, the side impact airbag module is a parasitic structure which requires additional attachment features for attachment in the appropriate location in the vehicle. Also, because of the substantial size of the side impact airbag module, packaging the module in the assembly is a common design problem.

It is desirable to provide a vehicle assembly design in which the airbag module is packaged in a vehicle in an efficient manner.

DISCLOSURE OF THE INVENTION

The present invention overcomes the above-referenced shortcomings of prior art assemblies by providing a side impact airbag module which is incorporated into a seat back frame assembly and acts as a structural, load-bearing component of the back frame assembly. In this manner, the airbag module may replace a portion of the back frame assembly, while eliminating any additional attachment features required for attaching the airbag module in the vehicle. This design also greatly enhances packaging efficiency within the seat, while properly positioning the side impact airbag module for deployment.

More specifically, the present invention provides a vehicle seat back frame assembly comprising a substantially U-shaped frame assembly incorporating a side impact airbag module as a structural, load-bearing component thereof. The substantially U-shaped back frame assembly includes a curved top portion having opposing ends with a spacer attached to one of the opposing ends. The side impact airbag module includes first and second ends, with the first end being attached to the other of the opposing ends of the top portion. First and second support members are attached to the spacer and the second end of the airbag module, respectively, for securing the seat back frame assembly in the vehicle.

Accordingly, an object of the present invention is to provide an apparatus for packaging a side impact airbag module within a seat in which packaging efficiency is improved by incorporating the side impact airbag module directly into the seat back frame assembly as a structural component thereof.

DETAILED DESCRIPTION OF THE PREFERRED EMBODIMENT

Figure 1:
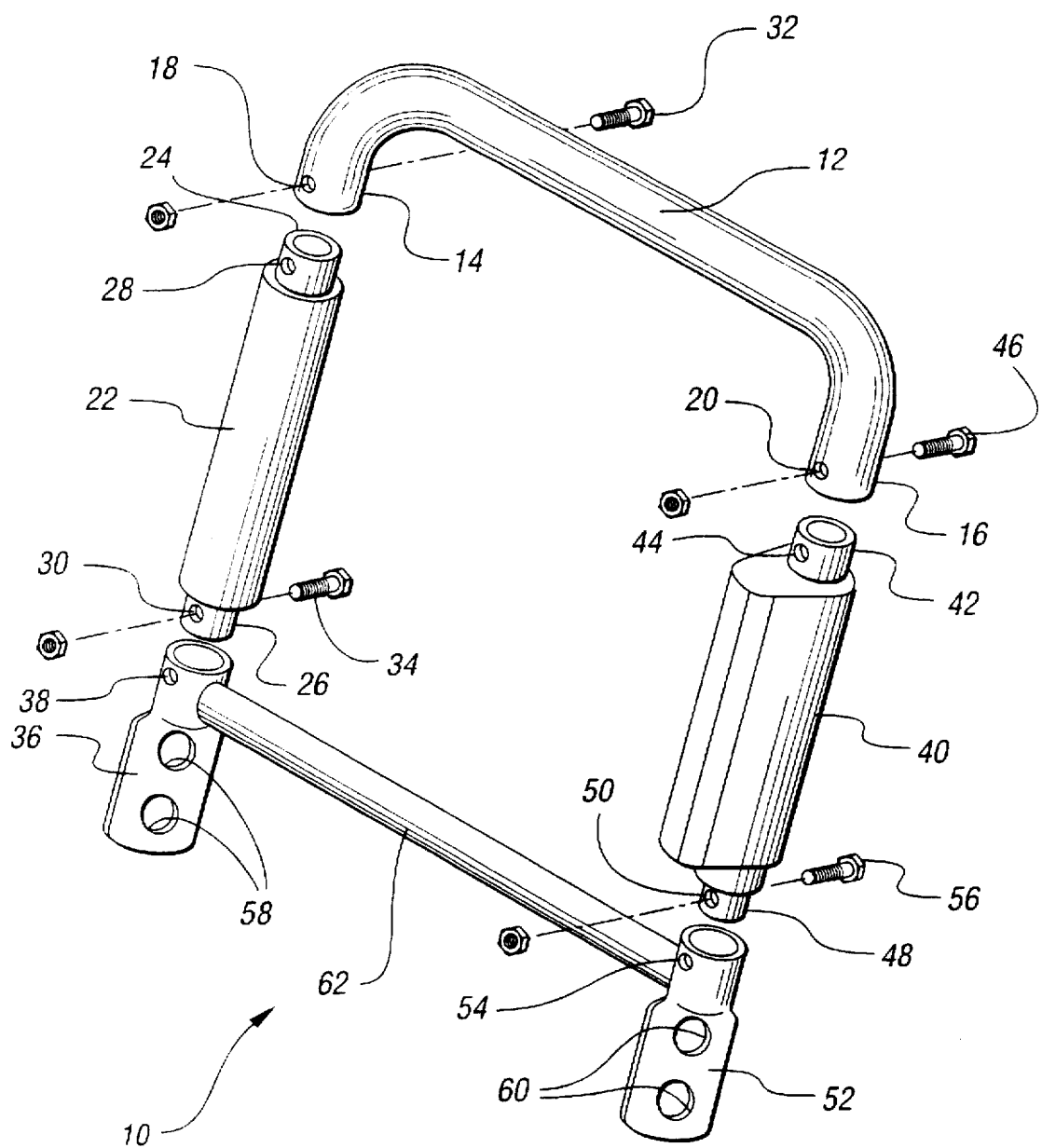
FIG. 1 shows an exploded perspective view of the vehicle seat back frame assembly incorporating a side impact airbag module in accordance with the present invention.

Referring to FIG. 1, a vehicle seat back frame assembly 10 is shown in accordance with the present invention. The seat back frame assembly 10 comprises a substantially U-shaped frame assembly which includes a curved top portion 12 having opposing ends 14, 16 with apertures 18, 20 formed therethrough, respectively. One end 14 of the curved top portion 12 is secured to a spacer 22. The spacer 22 includes tubular attachment members 24, 26 at opposing ends thereof, having apertures 28, 30 formed therethrough, respectively. The end 14 of the curved top portion 12 is secured over the tubular attachment member 24 of the spacer 22 by means of the bolt 32 extending through apertures 18 and 28 for attachment. Similarly, a bolt 34 secures the opposing end of spacer 22 to the first support member 36 by extending through the apertures 30 and 38.

The opposing end 16 of the curved top portion 12 is secured to the side impact airbag module 40 similarly by means of a tubular attachment member 42 having an aperture 44 formed therethrough for cooperation with the bolt 46, which extends through the apertures 20 and 44 for attachment when the tubular attachment member 42 is inserted into the end 16 of the curved top portion 12.

A tubular attachment member 48 is similarly secured to the opposite end of the side impact airbag module 40 for engagement in the second support member 52. The second support member 52 includes an aperture 54 which cooperates with the bolt 56 as it extends through the aperture 50 in the tubular attachment member 48. The first and second support members 36, 52 include attachment holes 58, 60 to facilitate attachment of the assembly 10 within a vehicle. A tubular cross member 62 extends between the first and second support members 36, 52 for added structural support.

The curved top portion 12, spacer 22, first and second support members 36, 52 and cross member 62 are preferably a steel tubing. The curved top portion 12 is preferably a lighter gauge steel tubing for weight reduction. Wiring harnesses (not shown) extend adjacent the seat back frame assembly for electrically interconnecting the side impact airbag module 40 for carrying deployment signals. The side impact airbag module 40 typically comprises a pyrotechnic or stored gas inflator in communication with a deployment bag. The module typically comprises a steel housing with a TPO plastic cover which allows the deploying airbag to penetrate therethrough.

Many commonly available side impact airbag modules, such as those manufactured by Allied Signal, TRW or Morton International (Autoliv) may be modified for use with the present invention. The only modification is that a tubular attachment member 42, 48 must be attached at opposing ends, as shown in the Figure.

This configuration has many advantages in manufacturing. The side impact airbag module 40 becomes a structural, load-bearing component of the seat back frame assembly, which greatly enhances packaging design. Weight of the overall assembly is reduced because the airbag module replaces a portion of the prior art seat back frame, and the attachment brackets for securing the prior art module to the back frame are eliminated.

The attachment configuration may be standardized between various vehicle designs. Also, this design reduces complexity of non-airbag versus airbag equipped seats because the side impact airbag module 40 may simply be replaced by a spacer, such as spacer 22, for eliminating the side impact airbag module. The design also reduces complexity in left versus right side seat installation because the spacer 22 and side impact airbag module 40 may simply be switched to opposing sides if the back frame assembly 10 is intended for installation in the left or right side of the vehicle.

This concept can also be related to any other seat frame construction, such as stamped, welded, molded, etc.

While the best mode for carrying out the invention has been described in detail, those familiar with the art to which this invention relates will recognize various alternative designs and embodiments for practicing the invention within the scope of the appended claims.

What is claimed is:

1. A vehicle seat back frame assembly comprising a substantially U-shaped frame assembly defining a structural gap therein axially along the frame assembly and incorporating a side impact airbag module bridging said structural gap as a structural, load-bearing component of the frame assembly, wherein the side impact airbag module forms a continuous, integral portion of said U-shape.

2. The vehicle seat back frame assembly of claim 1 wherein said substantially U-shaped frame assembly comprises:

a curved top portion having opposing ends;

a spacer attached to one of said opposing ends;

said side impact airbag module having first and second ends, the first end being attached to the other of said opposing ends; and first and second support members attached to said spacer and said second end of said airbag module, respectively, for securing the seat back frame assembly in the vehicle.

3. The vehicle seat assembly of claim 2 wherein said top portion, said spacer, and said first and second support members comprise steel tubing.

4. The vehicle seat assembly of claim 2 wherein said side impact airbag module comprises tubular attachment members at said first and second ends thereof.

5. The vehicle seat assembly of claim 2 further comprising a cross-member extending between said first and second support members.

6. An apparatus for supporting a side impact airbag module in a vehicle comprising a substantially U-shaped seat back frame assembly defining a structural gap therein axially along the frame assembly and incorporating the side impact airbag module assembly bridging said gap as a structural, load-bearing component of the frame assembly, wherein the side impact airbag module forms a continuous, integral portion of said U-shape.

7. The apparatus of claim 6 wherein said substantially U-shaped seat back frame assembly comprises:

a curved top portion having opposing ends;

a spacer attached to one of said opposing ends;

said side impact airbag module having first and second ends, the first end being attached to the other of said opposing ends; and first and second support members attached to said spacer and said second end of said airbag module, respectively, for securing the seat back frame assembly in the vehicle.

8. The apparatus of claim 7 wherein said top portion, said spacer, and said first and second support members comprise steel tubing.

9. The apparatus of claim 7 wherein said side impact airbag module comprises tubular attachment members at said first and second ends thereof.

10. A vehicle seat back frame assembly comprising:

a curved top portion having opposing ends;

a spacer attached to one of said opposing ends;

a side impact airbag module having first and second ends, the first end being attached to the other of said opposing ends of said curved top portion;

first and second support members attached to said spacer and said second end of said airbag module, respectively, for securing the seat back frame assembly in the vehicle, wherein said side impact airbag module acts as a structural, load-bearing component of the assembly and;

wherein said other end of the curved top portion and said second support member define a structural gap axially therebetween, and said side impact airbag module bridges said structural gap.

* * * * *